(12) United States Patent
Wakasa

(10) Patent No.: US 9,928,454 B2
(45) Date of Patent: Mar. 27, 2018

(54) HOST COMPUTER, CONTROL METHOD OF A HOST COMPUTER, AND MEDIUM

(71) Applicant: Seiko Epson Corporation, Tokyo (JP)

(72) Inventor: Shunichi Wakasa, Chikuma (JP)

(73) Assignee: Seiko Epson Corporation, Tokyo (JP)

( * ) Notice: Subject to any disclaimer, the term of this patent is extended or adjusted under 35 U.S.C. 154(b) by 31 days.

(21) Appl. No.: 15/244,187

(22) Filed: Aug. 23, 2016

(65) Prior Publication Data

US 2017/0061267 A1   Mar. 2, 2017

(30) Foreign Application Priority Data

Aug. 26, 2015 (JP) .................................. 2015-166830

(51) Int. Cl.
| | | |
|---|---|---|
| G06K 15/02 | (2006.01) | |
| G06K 15/00 | (2006.01) | |
| H04N 1/411 | (2006.01) | |
| G06F 3/12 | (2006.01) | |
| H04N 1/41 | (2006.01) | |

(52) U.S. Cl.
CPC ......... *G06K 15/408* (2013.01); *G06F 3/1212* (2013.01); *G06F 3/1297* (2013.01); *G06K 15/1805* (2013.01); *G06K 15/1848* (2013.01); *H04N 1/41* (2013.01); *H04N 1/411* (2013.01); *G06K 15/1825* (2013.01)

(58) Field of Classification Search
CPC ............. G06K 15/408; G06K 15/1805; G06K 15/1848; G06K 15/1825; G06F 3/1212; G06F 3/1297; H04N 1/411

USPC ................................................ 358/1.13, 1.15
See application file for complete search history.

(56) References Cited

U.S. PATENT DOCUMENTS

| 6,885,471 B1 * | 4/2005 | Minowa ................. G06K 15/00 347/5 |
| 2003/0038959 A1 * | 2/2003 | Kuroi ..................... G06K 15/00 358/1.11 |
| 2005/0141029 A1 | 6/2005 | Teradaira et al. |

FOREIGN PATENT DOCUMENTS

| JP | 2000-298563 A | 10/2000 |
| JP | 2002-187315 A | 7/2002 |
| JP | 2004-032214 A | 1/2004 |
| JP | 2011-223502 A | 11/2011 |

* cited by examiner

*Primary Examiner* — Kent Yip
(74) *Attorney, Agent, or Firm* — Foley & Lardner LLP

(57) ABSTRACT

A printer driver enables appropriately executing real-time commands without causing operating errors even when print data is compressed for transmission to a printer. A driver causing a host computer that connects to a printer to execute a process, including causing the host computer to generate first commands executed by the printer in the order received, and second commands executed with priority over the first commands; generate print data including the first commands and send the print data to the printer; and execute a compression process converting data of the first commands contained in the print data to compressed data not containing a data train identical to a second command when generating the print data.

20 Claims, 3 Drawing Sheets

DATA SIZE AFTER COMPRESSION

| COMPRESSION LEVEL / DATA FILE NAME | 1 | 2 | 3 | 4 | 5 | 6 | 7 | 8 | 9 | ORIGINAL DATA SIZE |
|---|---|---|---|---|---|---|---|---|---|---|
| 001.prn | 2981 | 2944 | 2944 | 2795 | 2770 | 2712 | 2701 | 2686 | 2686 | 18432 |
| 002.prn | 934 | 920 | 910 | 848 | 845 | 790 | 786 | 779 | 779 | 18432 |
| 003.prn | 3357 | 3301 | 3301 | 3141 | 3082 | 2996 | 2984 | 2947 | 2939 | 18432 |
| 004.prn | 3253 | 3230 | 3194 | 3058 | 2970 | 2910 | 2883 | 2865 | 2864 | 18432 |
| 005.prn | 2095 | 1978 | 1912 | 1834 | 1714 | 1662 | 1660 | 1653 | 1600 | 18432 |

FIG. 3

HOST COMPUTER, CONTROL METHOD OF A HOST COMPUTER, AND MEDIUM

This application claims priority under 35 U.S.C. § 119 to Japanese Patent Application No. 2015-166830 filed on Aug. 26, 2015, the entire disclosure of which is expressly incorporated by reference herein.

BACKGROUND

1. Technical Field

The present invention relates to a host computer, and relates more particularly to a control method of a host computer for appropriately executing real-time commands without causing an operating error even when print data is compressed for transmission to a printer.

2. Related Art

Instructions (commands) sent to a printer include commands (referred to below as normal commands) such as print commands that are processed in the order transmitted (in the order received by the printer), and commands (referred to below as real-time commands) that are executed with priority over normal commands immediately upon receipt by the printer.

Real-time commands include commands to return information indicating the status of the printer (status information), commands to clear data stored in data buffers of the printer, and commands to operate (drive) devices connected to a printer, such as to open a drawer or sound an alarm.

Binary data such as image data may be contained (added to) in some commands that are sent to a printer, such as print commands for printing images and graphics, and the data train in such commands may contain a data train identical to the data train of a real-time command. In this event, the printer that receives the data train may erroneously interpret image data to be printed as a real-time command, and an unintended real-time command may be executed. Unintended operations caused by such false real-time commands may result in essential data being cleared, for example, and must be avoided.

To avoid problems, the device described in JP-A-2000-298563 uses the equivalent of a prohibit real-time command to prevent the printer from executing real-time commands.

Operating environments in which printers are used by mobile terminals that send print commands to the printer by wireless communication are increasingly common. To improve the printing performance of the printer and assure print quality at a constant print speed in such environments, the host device compresses the data to be transmitted in order to shorten the data transmission time to the printer.

As described above, the compressed data may also contain data trains identical to a real-time command, and when a data train identical to a real-time command is detected in the compressed data, the original data is sent to the printer without being compressed.

However, if the original, uncompressed data is transmitted in an environment in which the data is preferably compressed for transmission as described above, operating errors caused by false real-time commands resulting from compression can be avoided, but printers that print continuously may need to reduce the print speed due to communication delays, and printing problems, such as the introduction of white bands (blank bands) to images printed by changing the print speed may result.

When the method described in JP-A-2000-298563 is used, operating errors caused by false real-time commands can be prevented in the printer even if compressed data containing a data train identical to a real-time command is sent, but executing a true (valid) real-time command while sending compressed data may also be necessary. However, because the printer is prohibited from executing real-time commands, even valid real-time commands that are sent are ignored and not executed.

SUMMARY

A host computer according to the invention enables appropriately executing real-time commands without causing operating errors even when print data is compressed for transmission to a printer.

One aspect of the invention achieving the foregoing objective is a host computer configured to connect to a printer, comprising: a controller configured to be able to generate first command executed by the printer in the order received, and second command executed with priority over the first command; generate print data including the first command and send the print data to the printer; and execute a compression process converting data of the first command contained in the print data to compressed data not containing a data train identical to the second command when generating the print data.

This configuration sends first command instructing printing images contained in print data together with large data objects such as image data for the images to a printer as compressed data not containing a data train identical to a second command that is executed with priority over first command. The printer can therefore be prevented from executing a second command in error. Furthermore, because large data objects can always be transmitted as compressed data, data can be transmitted quickly to a printer, and a drop in print quality from white bands resulting from reducing the print speed of the printer can be prevented.

Preferably, the compression process is a process of compressing the data by a different compression method until the compressed data does not contain a data train identical to the second command.

This configuration can reliably output compressed data not containing a data train identical to the second command.

In another aspect of the invention, the compression process is a process of compressing the data at a different compression ratio until the compressed data does not contain the data train identical to the second command.

This configuration can output compressed data not containing the data train identical to the second command by a relatively simple method.

In another aspect of the invention, the second command include at least one of a command to clear data stored in a data buffer of the printer, and a command instructing driving a device connected to the printer.

This configuration can preventing the operating errors on the printer resulting from second command that have a significant adverse effect when executed in error.

In another aspect of the invention, data of the first command is converted to compressed data contains image data.

This configuration can increase the transmission speed of print data sent to the printer.

In another aspect of the invention, the first command includes a print request for a receipt.

This configuration can suppress the occurrence of white lines (bands) in the receipt by a line printer in which white bands can easily result in printed images due to variations in the print speed, and because the print speed is also fast, transmitting print data as compressed data to the printer is even more effective.

Another aspect of the invention is a control method of a host computer configured to connect to a printer, the control method causing the host computer to execute steps including: generating and sending print data including first command to the printer; and executing a compression process converting data of the first command contained in the print data to compressed data not containing a data train identical to a second command when generating the print data, wherein the first command is executed by the printer in the order received, and the second command is executed with priority over the first command.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 shows examples of compression levels and the size of the compressed data.

DESCRIPTION OF EMBODIMENTS

Figure 1:
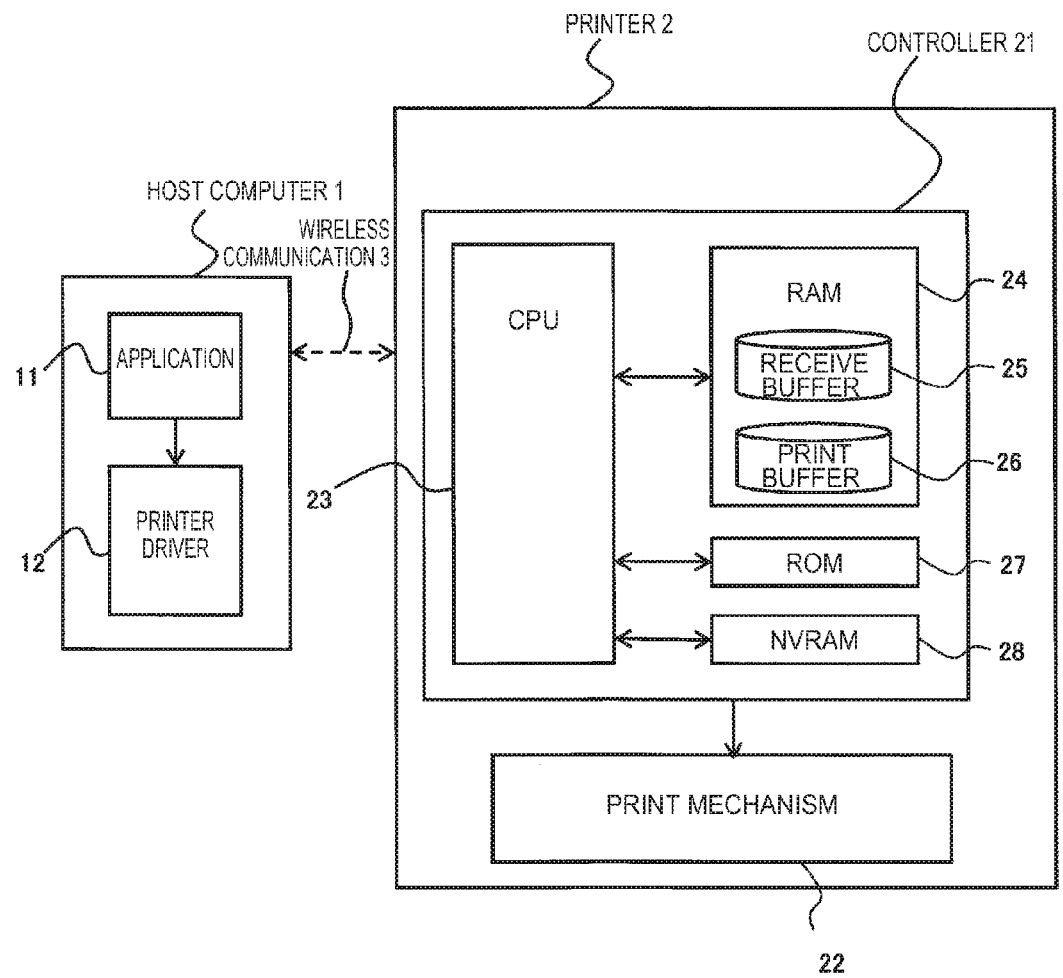
FIG. 1 illustrates the configuration of a printing system using a host computer 1 according to the invention.

An embodiment of the present invention is described below with reference to the accompanying figures. However, the embodiment described below does not limit the technical scope of the invention. Note that in the figures like or similar parts are identified by the same reference numerals or reference symbols.

FIG. 1 illustrates the configuration of a printing system using a host computer 1 according to the invention. The printer driver 12 in the host computer 1 shown in FIG. 1 is an example of a printer driver in the host computer 1 according to this embodiment of the invention. The printer driver 12 causes the host computer 1 to execute various processes. The printer driver 12 compresses and then sends print commands for images (first command, referred to below as print instruction command) together with the image data to be printed to the printer 2. Compression repeats using different methods in the compression process until there are no data trains in the data after being compressed (referred to below as compressed data) that are the same as the data train of a real-time command (second command), resulting in compressed data not containing a data train identical to a real-time command. The printer 2 is therefore prevented from erroneously executing false real-time commands, image data of a large data size can always be transmitted in a compressed form, and the communication speed does not become a bottleneck resulting in reducing the print speed of the printer 2. Furthermore, because the printer 2 can always execute real-time commands, required real-time commands can be executed immediately even during image data transmission.

The printing system according to the embodiment shown in FIG. 1 includes a host computer 1 and printer 2 that connect by Bluetooth® or other type of wireless communication 3. This printing system may function as part of a POS system, for example, and prints primarily sales receipts after sales transactions.

The host computer 1 is a host device of a printer 2, and sends print commands for printing receipts, for example, to the printer 2. In this example, the host computer 1 is a POS terminal and executes a transaction process at the time of sale. The host computer 1 may also be a mobile terminal device that is held by a sales clerk, for example.

The hardware configuration of the host computer 1 includes a CPU (controller), ROM, RAM, hard disk drive, display device, communication interface, operating device, and input devices such as a barcode reader.

The functional configuration of the host computer 1 includes an application 11 and a printer driver 12 as shown in FIG. 1.

The application 11 in this example is a POS application, and executes a transaction process at the time of sale, for example. More specifically, the application 11 calculates and displays a transaction total based on information about the purchased products input from a barcode reader or other input device, and issues a print request for a receipt after receipt of payment. The print request for a receipt is sent to the printer driver 12 in a standard print request data format such as GDI (Graphics Device Interface).

The receipt contains a store logo, time of sale, the name, quantity, and price of each purchased product, the transaction total, and a barcode including information about the store and clerk, for example, and this information is printed by the printer 2. Data expressing these print objects is contained in the print request data.

The application 11 is stored on a hard disk drive or other memory device of the host computer 1, and is processed by the CPU of the host computer 1 and RAM in which the process data is loaded.

The printer driver 12 is a driver for the printer 2. receives print request data from the application 11 described above, and generates print data instructing the printer 2 to print as required by the print request data. The printer driver 12 then sends the generated print data to the printer 2. The print data the printer driver 12 generates is expressed by commands for the printer 2.

Commands for the printer 2 include, as described above, commands (referred to below as normal commands (first commands)) processed in the order transmitted from the host computer 1 (in the order received by the printer 2), and commands (referred to below as real-time commands (second commands)) that are executed immediately with priority over normal commands after being received by the printer 2.

Commands (referred to below as print instruction commands) expressing the print instructions for the print objects contained in the print data are normal commands. Of the objects printed on a receipt, the store logo and barcode, for example, are contained in the print instruction commands as image data (data in which each pixel contains color information), and the time of sale, transaction total, and other information is contained in the print instruction commands as codes representing the text (characters) to be printed.

Commands transmitted before sending print instruction commands for acquiring status information of the printer 2, and commands for clearing data stored in a data buffer (receive buffer 25 or print buffer 26 in this example) of the printer 2 that are transmitted to stop printing, are real-time commands. Commands instructing driving external devices, such as commands instructing opening the drawer and commands for sounding an alarm that are sent to a printer 2 connected to a cash drawer and speaker (examples of external devices in this embodiment), are also real-time commands. These real-time commands may be issued by the printer driver 12 or a utility program not shown for the printer 2.

To send image data and other types of data objects that are large to the printer 2, the printer driver 12 includes the data as compressed data in the print data. The printing system according to this embodiment is characterized by the process of generating the compressed data (the compression process), the specific content of which is described below.

Note that the printer driver 12 is stored in a hard disk drive or other storage device of the host computer 1, and is processed using the CPU of the host computer 1 and RAM to which process data is loaded.

The printer 2 is a POS printer that prints receipts as instructed by the host computer 1. The printer 2 in this example is a line printer with an inkjet or thermal line head, and prints continuously (without stopping conveyance of the paper while printing) to paper (such as roll paper) as the print medium.

As shown in FIG. 1, the printer 2 has a controller 21 and print mechanism 22. While not shown in the figure, the printer 2 may also have or be connectable to a display device for the user, an operating device for user operations, a speaker or other device for sounding warnings, a wireless communication interface, and a drawer for holding money.

The controller 21 is the part that controls operation of the printer 2, and as shown in FIG. 1 comprises a CPU 23, RAM 24, ROM 27, and NVRAM 28.

The CPU 23 operates according to firmware stored in ROM 27, and controls (processes) parts of the printer 2. When print data is received from the host computer 1, the CPU 23 interprets the commands in the print data, and controls the printing process of the print mechanism 22 according to the interpreted commands. When a real-time command is received, the CPU 23 immediately executes the command content with priority over normal commands.

The receive buffer 25 and print buffer 26 are reserved in RAM 24. The receive buffer 25 is a data buffer for storing (accumulating) commands (data) in the order received from the host computer 1. The print buffer 26 stores image data in a form enabling printing by the line head of the print mechanism 22, and is a data buffer that stores (accumulates) the image data to be printed. The image data stored in the print buffer 26 is sent sequentially to the print mechanism 22 and used to instruct the printing process described above.

Information that should be stored without being erased when the printer 2 power turns off, such as configuration settings and status information, is stored in NVRAM 28.

The print mechanism 22 is the part that executes the printing process on paper as instructed by the controller 21, and includes the paper conveyance unit and line head or other print unit. In this example, the print mechanism 22 prints receipts as instructed by the controller 21.

The printer 2 stores commands received from the host computer 1 in the receive buffer 25 in the order received. When the received command is a normal command, the CPU 23 executes the commands in FIFO (first in, first out) order, that is, sequentially from the command that was stored first. When the received command is a real-time command, the CPU 23 executes the command immediately upon receipt with priority over normal commands. Because real-time commands stored in the receive buffer 25 are already processed, they are discarded when reached at the FIFO process timing.

Print instruction commands processed as normal commands in the order described above are temporarily stored to the receive buffer 25, and interpreted by the CPU 23 when processed to generate the image data to be printed. The generated image data is then stored to the print buffer 26 and sequentially passed to the print mechanism 22. Note that when the data to print is compressed data, the CPU 23 decompresses the compressed data and then generates the image data.

The printing system according to this embodiment of the invention is characterized by the process of the printer driver 12 of the host computer 1. The content of this process is described further below.

Figure 2:
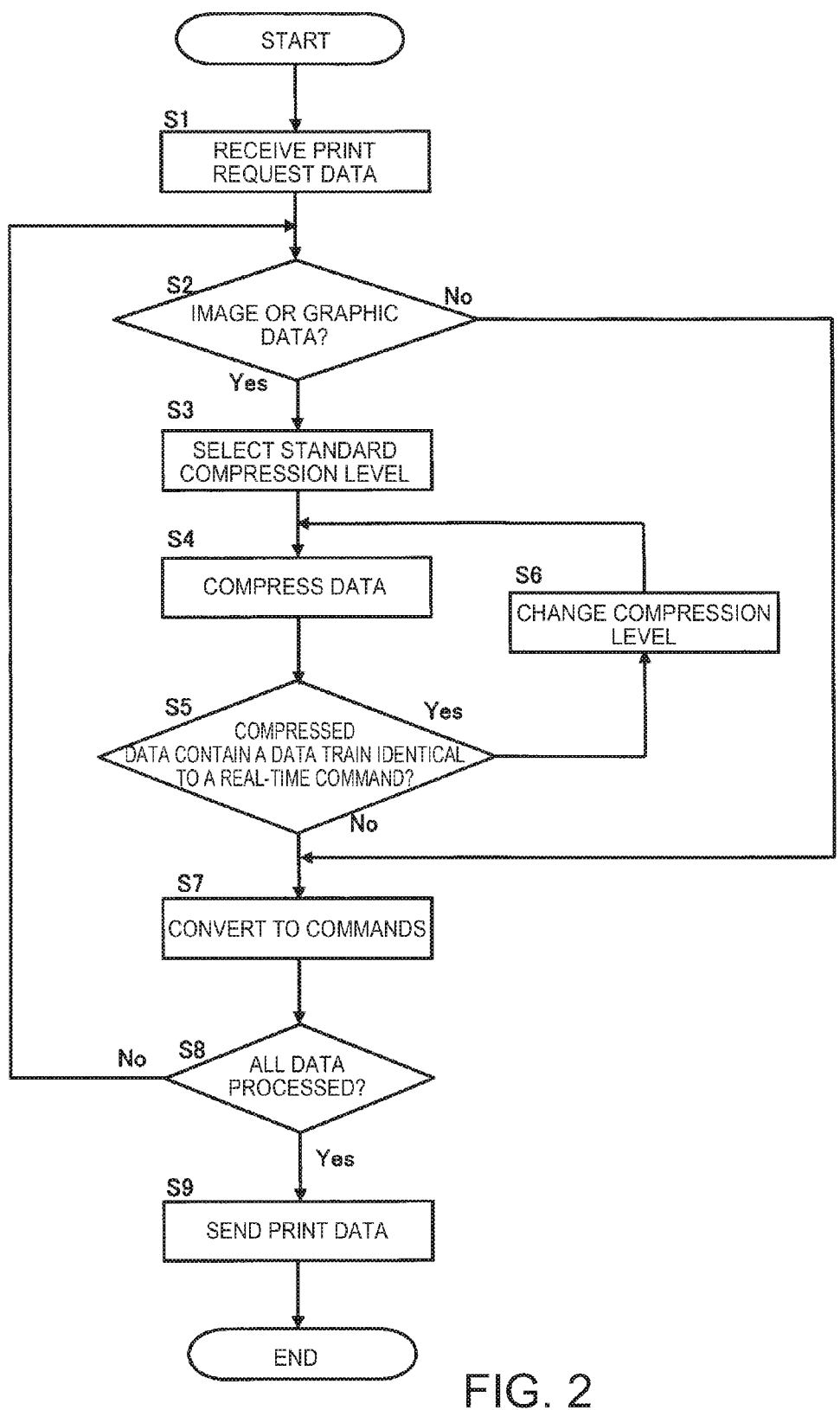
FIG. 2 is a flow chart of an exemplary process executed by the host computer 1.

FIG. 2 is a flow chart illustrating steps in the process of the printer driver 12. The process executed when the printer driver 12 receives print request data is described below based on FIG. 2.

print request data is first received from the application 11 of the host computer 1 (step 1 in FIG. 2). Note that the print request data in this example requests printing one receipt.

Next, the printer driver 12 causes the host computer 1 to execute the process of steps S2 to S8 in FIG. 2 for each specific unit based on the received print request data. Data for pre-printing processes such as setting print conditions, data indicating the print objects, and data for post-printing processes such as cutting the paper, are contained in the print request data, and the printer driver 12 processes the data indicating the print objects by executing the process of steps S2 to S8 in FIG. 2 for each object. An object means a specific image (image or graphic) or specific character (text) block.

First, in step s2, the printer driver 12 determines if the object to be processed is data expressing an image or graphic print object. If the result is the data does not indicate an image or graphic object (step 2 in FIG. 2: No), the process goes to step S7.

If the result is the data indicates an image or graphic object (step 2 in FIG. 2: Yes), the printer driver 12 applies the compression process (step S3 to step S5: No) to the data.

The compression process compresses the data of the process object, and the data compression method in this example uses deflate compression, or more specifically zlib compression. There are ten compression levels (1-10) in zlib that differ by the compression ratio.

In the compression process the printer driver 12 first selects the standard compression level as the compression level to use for data compression (step 3 in FIG. 2). More specifically, the printer driver 12 selects compression level 6.

Next, the printer driver 12 compresses the target data at the selected compression level (step 4 in FIG. 2).

Next, the printer driver 12 determines if a data train identical to a specific real-time command is contained in the compressed data that is generated (step 5 in FIG. 2). Commands to be prevented from executing erroneously unless actually issued are previously selected as the specific real-time commands, such as commands for clearing data stored in the data buffer, and commands instructing driving a device.

A method known from the literature may be used as the search process for determining if a data train identical to a specific real-time command is contained in the compressed data.

If the decision is that a data train identical to a specific real-time command is not contained in the compressed data (step 5 in FIG. 2: No), the process goes to S7.

If the decision is that a data train identical to a specific real-time command is contained in the compressed data (step 5 in FIG. 2: Yes), the printer driver 12 changes the compression level (step 6 in FIG. 2). More specifically, a compression level that has not already been used (selected)

for use with the process data is selected. The first time this step is applied to the process data, a compression level other than the standard compression level (compression level 6) is selected. The order in which the compression level is changed (selected) may be predefined or selected randomly.

Next, the printer driver 12 compresses the data again using the selected compression level (step 4 in FIG. 2).

Step S6, step S4, and step S5 thus repeat until it is determined that a data train identical to a specific real-time command is not contained in the compressed data (step 5 in FIG. 2: No). More specifically, the compression level is changed and the data is compressed again until a data train identical to a specific real-time command is not contained in the compressed data.

Note that data compression in step S4 is always applied to the received data.

When the process gets to step S7, the printer driver 12 expresses the processed data as commands for the printer 2 (generates commands, that is, adds first commands indicating image printing commands to the image data in a format that can be interpreted by the printer 2), and ends processing the target data (data of the specific unit described above).

The printer driver 12 then repeats steps S2 to S8 until processing all data (data of the specific units) is completed (step 8 in FIG. 2: Yes).

As a result of this process, image data and graphics data is compressed and converted to commands (the print instruction commands described above), text and other data is converted to commands (the print instruction commands described above) without being compressed, and print data appropriate to the received print request data is generated.

When all processing of the received print request data ends (step 8 in FIG. 2: Yes), the printer driver 12 sends the generated print data to the printer 2 (step 9 in FIG. 2).

The process of the printer driver 12 when a print request is received thus ends, and the printer 2 receives the transmitted print data and prints according to the print data. A receipt is therefore printed in this example.

The printer driver 12 may also send a real-time command to the printer 2 as needed, and the printer 2 that receives the real-time command immediately executes the real-time command with priority over normal commands as described above.

FIG. 3 shows an example of the compression levels and the size of the compressed data. FIG. 3 shows the size of the compressed data object in bytes when each of five different data files (001.prm-005.prm) are compressed at compression levels 1 to 9. It will be understood by comparing the compressed data size of each data file with the original data size shown in the right column that a commensurate compression effect is achieved at each compression level, and there is no great difference (there is not a difference of order) between compression level 1 with the lowest compression ratio and compression level 9 with the highest compression ratio. Therefore, regardless of the final compression level selected (used) in the compression process described in FIG. 2, there is not a significant difference in the size of the compressed data, and the time required for transmission to the printer 2 does not increase significantly.

As described above, with the printer driver 12 according to this embodiment, image data and other large data objects contained in print data is sent to the printer 2 as compressed data not containing a data train identical to a specific real-time command, and the printer 2 can be prevented from operating mistakenly based on a specific real-time command. Furthermore, because large data objects can always be transmitted as compressed data, data can be transmitted quickly to a printer 2 such as a line printer with a line head, and a drop in print quality from white bands resulting from reducing the print speed of a printer 2 that prints continuously can be prevented. In addition, because real-time commands can always be executed on the printer 2 side, necessary real-time commands can be immediately executed even while transmitting print data.

These effects can be achieved with a printer driver.

Furthermore, a method of changing the compression level used to compress data again to generate compressed data that does not contain a data train identical to a specific real-time command can be easily achieved.

Furthermore, by selecting commands that clear data stored in a data buffer, and commands instructing driving a device, are set as the specific real-time commands, operating errors that have a major effect can be prevented.

The foregoing embodiment selects a different zlib compression level for second and later compression passes so that the compressed data does not contain a data train identical to a specific real-time command, but the invention is not so limited. For example, a compression method in which the content (data train) of the compressed data changes may be selected instead.

The foregoing describes generating compressed data that does not contain a data train identical to a specific real-time command, but may be generated to not contain a data train identical to any real-time command.

The scope of the invention is not limited to the foregoing embodiment, and includes the invention described in the accompanying claims and equivalents thereof.

What is claimed is:

1. A host computer configured to connect to a printer, the host computer comprising:
   a controller configured to:
      generate commands of a first type to be executed by the printer in the order received, and generate commands of a second type to be executed by the printer with priority over commands of the first type;
      generate print data that includes a command of the first type and data associated with the command of the first type;
      execute a compression process in which the data associated with the command of the first type is converted to compressed data;
      retrieve at least one predetermined data train associated with commands of the second type;
      compare at least a portion of the compressed data to the predetermined data train;
      determine, based on the comparison, whether the compressed data includes a data train identical to the at least one predetermined data train;
      transmit the compressed data to the printer in response to determining that the compressed data does not include the data train identical to the at least one predetermined data train; and
      iteratively, responsive to determining that the compressed data includes a data train identical to the at least one predetermined data train, perform processes that comprise:
         executing a compression process different than a compression process previously used by the controller to compress the data associated with the command of the first type; and
         determining whether the resultant compressed data includes a data train identical to the at least one predetermined data train, until the controller determines that the resultant compressed data does not include a data train identical to the at least one predetermined data train.

2. The host computer described in claim 1, wherein the compression process comprises iteratively compressing the data associated with the command of the first type at a compression ratio that differs with each iteration until the resultant compressed data does not contain the data train identical to the at least one predetermined data train.

3. The host computer described in claim 1, wherein the commands of the second type include at least one of a command to clear data stored in a data buffer of the printer, and a command instructing driving a device connected to the printer.

4. The host computer described in claim 1, wherein the data corresponding to the command of the first type comprises image data.

5. The host computer described in claim 1, wherein the commands of the first type include a print request for a receipt.

6. A control method of a host computer configured to connect to a printer, the control method causing the host computer to execute steps including:
generating a command of a first type to be executed by the printer in the order received;
executing a compression process in which data associated with the command of the first type is converted to compressed data;
retrieving at least one predetermined data train corresponding to a command of a second type to be executed with priority over commands of the first type;
comparing at least a portion of the compressed data to the predetermined data train;
determining, based on the comparison, whether the compressed data includes a data train identical to the at least one predetermined data train;
transmitting the compressed data to the printer in response to determining that the compressed data does not include the data train identical to the at least one predetermined data train; and
iteratively, responsive to determining that the compressed data includes a data train identical to the at least one predetermined data train, performing processes that comprise:
executing a compression process different than a compression process previously used by the controller to compress the data associated with the command of the first type; and
determining whether the resultant compressed data includes a data train identical to the at least one predetermined data train,
until the host computer determines that the resultant compressed data does not include a data train identical to the at least one predetermined data train.

7. The control method of a host computer described in claim 6, wherein
the compression process comprises iteratively compressing the data associated with the command of the first type at a compression ratio that differs with each iteration until the resultant compressed data does not contain the data train identical to the at least one predetermined data train.

8. The control method of a host computer described in claim 6, wherein commands of the second type include at least one of a command to clear data stored in a data buffer of the printer, and a command instructing driving a device connected to the printer.

9. The control method of a host computer described in claim 6, wherein
the data associated with the command of the first type comprises image data.

10. The control method of a host computer described in claim 6, wherein
the command of the first type includes a print request for a receipt.

11. A non-transitory controller readable medium storing a program causing a controller in a computer configured to connect to a printer to execute steps including:
generating a command of a first type to be executed by the printer in the order received; and
executing a compression process in which data associated with the command of the first type is converted to compressed data;
retrieving at least one predetermined data train corresponding to a command of a second type that is executed with priority over commands of the first type;
comparing at least a portion of the compressed data to the predetermined data train;
determining, based on the comparison, whether the compressed data includes a data train identical to the at least one predetermined data train;
transmitting the compressed data to the printer in response to determining that the compressed data does not include the data train identical to the at least one predetermined data train; and
iteratively, responsive to determining that the compressed data includes a data train identical to the at least one predetermined data train, performing processes that comprise:
executing a compression process different than a compression process previously used by the controller to compress the data associated with the command of the first type; and
determining whether the resultant compressed data includes a data train identical to the at least one predetermined data train,
until the host computer determines that the resultant compressed data does not include a data train identical to the at least one predetermined data train.

12. A host computer configured to connect to a printer, the host computer comprising:
a controller configured to:
generate commands of a first type to be executed by the printer in the order received, and generate commands of a second type to be executed by the printer with priority over commands of the first type;
generate print data that includes a command of the first type and data associated with the command of the first type;
execute a compression process in which the data associated with the command of the first type is converted to compressed data;
retrieve at least one predetermined data train associated with commands of the second type;
compare at least a portion of the compressed data to the predetermined data train;
determine, based on the comparison, whether the compressed data includes a data train identical to the at least one predetermined data train; and transmit the compressed data to the printer in response to determining that the compressed data does not include the data train identical to the at least one predetermined data;

wherein the compression process comprises iteratively compressing the data associated with the command of the first type at a compression ratio that differs with each iteration until the resultant compressed data does not contain the data train identical to the at least one predetermined data train.

13. The host computer described in claim 12, wherein the commands of the second type include at least one of a command to clear data stored in a data buffer of the printer, and a command instructing driving a device connected to the printer.

14. The host computer described in claim 12, wherein the data corresponding to the command of the first type comprises image data.

15. The host computer described in claim 12, wherein the commands of the first type include a print request for a receipt.

16. A control method of a host computer configured to connect to a printer, the control method causing the host computer to execute steps including:

generating a command of a first type to be executed by the printer in the order received;

executing a compression process in which data associated with the command of the first type is converted to compressed data;

retrieving at least one predetermined data train corresponding to a command of a second type to be executed with priority over commands of the first type;

comparing at least a portion of the compressed data to the predetermined data train;

determining, based on the comparison, whether the compressed data includes a data train identical to the at least one predetermined data train; and transmitting the compressed data to the printer in response to determining that the compressed data does not include the data train identical to the at least one predetermined data train;

wherein the compression process comprises iteratively compressing the data associated with the command of the first type at a compression ratio that differs with each iteration until the resultant compressed data does not contain the data train identical to the at least one predetermined data train.

17. The control method of a host computer described in claim 16, wherein commands of the second type include at least one of a command to clear data stored in a data buffer of the printer, and a command instructing driving a device connected to the printer.

18. The control method of a host computer described in claim 16, wherein the data associated with the command of the first type comprises image data.

19. The control method of a host computer described in claim 16, wherein the command of the first type includes a print request for a receipt.

20. A non-transitory controller readable medium storing a program causing a controller in a computer configured to connect to a printer to execute steps including:

generating a command of a first type to be executed by the printer in the order received; and executing a compression process in which data associated with the command of the first type is converted to compressed data;

retrieving at least one predetermined data train corresponding to a command of a second type that is executed with priority over commands of the first type;

comparing at least a portion of the compressed data to the predetermined data train;

determining, based on the comparison, whether the compressed data includes a data train identical to the at least one predetermined data train;

transmitting the compressed data to the printer in response to determining that the compressed data does not include the data train identical to the at least one predetermined data train;

wherein the compression process comprises iteratively compressing the data associated with the command of the first type at a compression ratio that differs with each iteration until the resultant compressed data does not contain the data train identical to the at least one predetermined data train.

* * * * *